United States Patent
Post et al.

(10) Patent No.: US 8,438,453 B2
(45) Date of Patent: May 7, 2013

(54) LOW LATENCY READ OPERATION FOR MANAGED NON-VOLATILE MEMORY

(75) Inventors: Daniel Jeffrey Post, Campbell, CA (US); Nir Jacob Wakrat, Los Altos, CA (US); Vadim Khmelnitsky, Foster City, CA (US)

(73) Assignee: Apple Inc., Cupertino, CA (US)

( * ) Notice: Subject to any disclaimer, the term of this patent is extended or adjusted under 35 U.S.C. 154(b) by 516 days.

(21) Appl. No.: 12/538,053

(22) Filed: Aug. 7, 2009

(65) Prior Publication Data

US 2010/0287446 A1    Nov. 11, 2010

Related U.S. Application Data

(60) Provisional application No. 61/176,055, filed on May 6, 2009.

(51) Int. Cl.
*G11C 29/00*    (2006.01)

(52) U.S. Cl.
USPC ........................................................ 714/763

(58) Field of Classification Search ........................ None
See application file for complete search history.

(56) References Cited

U.S. PATENT DOCUMENTS

| | | | |
|---|---|---|---|
| 4,937,830 A * | 6/1990 | Kawashima et al. ......... | 714/772 |
| 5,341,489 A | 8/1994 | Heiberger et al. | |
| 5,434,872 A * | 7/1995 | Petersen et al. ............... | 714/811 |
| 5,524,218 A * | 6/1996 | Byers et al. ................... | 710/305 |
| 5,559,449 A | 9/1996 | Padoan et al. | |
| 5,613,144 A | 3/1997 | Hall et al. | |
| 5,615,162 A | 3/1997 | Houston | |
| 5,673,223 A | 9/1997 | Park | |
| 5,732,094 A * | 3/1998 | Petersen et al. ............... | 714/805 |
| 5,751,631 A | 5/1998 | Liu et al. | |
| 6,092,158 A | 7/2000 | Harriman et al. | |
| 6,134,149 A | 10/2000 | Lin | |
| 6,148,354 A * | 11/2000 | Ban et al. ...................... | 710/301 |
| 6,449,111 B1 * | 9/2002 | Kool et al. ..................... | 360/48 |
| 6,684,301 B1 | 1/2004 | Martin | |
| 7,372,715 B2 | 5/2008 | Han | |
| 7,374,108 B2 * | 5/2008 | Toombs et al. ............... | 235/492 |
| 7,975,109 B2 | 7/2011 | McWilliams et al. | |

(Continued)

OTHER PUBLICATIONS

Toelkes et al., "Architecture for Address Mapping of Managed Non-Volatile Memory", U.S. Appl. No. 12/614,369, filed Nov. 6, 2009.

(Continued)

*Primary Examiner* — Guerrier Merant
(74) *Attorney, Agent, or Firm* — Meyertons, Hood, Kivlin, Kowert & Goetzel, P.C.

(57) ABSTRACT

In a memory system, a host controller is coupled to a non-volatile memory (NVM) package (e.g., NAND device). The host controller sends a read command to the NVM package requesting a low latency read operation. Responsive to the read command, a controller in the NVM package retrieves the data and sends the data to an ECC engine for correcting. Following the read command, the host controller sends a read status request command to the controller in the NVM package. Responsive to the read status request, the controller sends a status report to the host controller indicating that some or all of the data is available for transfer to the host controller. Responsive to the report, the host controller transfers the data. An underrun status can be determined to indicate that uncorrected data had been transferred to the host controller.

22 Claims, 8 Drawing Sheets

U.S. PATENT DOCUMENTS

| | | | |
|---|---|---|---|
| 7,979,658 | B2 | 7/2011 | Obereiner et al. |
| 2002/0194451 | A1 | 12/2002 | Mukaida et al. |
| 2003/0046628 | A1 | 3/2003 | Rankin et al. |
| 2003/0200411 | A1 | 10/2003 | Maeda et al. |
| 2004/0139286 | A1 | 7/2004 | Lin et al. |
| 2004/0153902 | A1* | 8/2004 | Machado et al. ............ 714/710 |
| 2004/0257888 | A1* | 12/2004 | Noguchi et al. ............ 365/200 |
| 2005/0166007 | A1 | 7/2005 | Ono |
| 2006/0039196 | A1* | 2/2006 | Gorobets et al. ......... 365/185.01 |
| 2006/0059406 | A1* | 3/2006 | Micheloni et al. ............ 714/763 |
| 2006/0164907 | A1 | 7/2006 | Nguyen |
| 2006/0248432 | A1 | 11/2006 | Barrett et al. |
| 2007/0043900 | A1 | 2/2007 | Yun |
| 2007/0050668 | A1* | 3/2007 | Gans ................................ 714/6 |
| 2007/0106919 | A1 | 5/2007 | Chang et al. |
| 2007/0136512 | A1* | 6/2007 | Toombs et al. ............... 711/103 |
| 2007/0140007 | A1 | 6/2007 | Terauchi |
| 2007/0165458 | A1 | 7/2007 | Leong et al. |
| 2007/0168625 | A1 | 7/2007 | Cornwell et al. |
| 2007/0271494 | A1* | 11/2007 | Gorobets ...................... 714/763 |
| 2008/0069098 | A1 | 3/2008 | Shah et al. |
| 2008/0126776 | A1 | 5/2008 | Takayama |
| 2008/0147968 | A1 | 6/2008 | Lee et al. |
| 2008/0147994 | A1 | 6/2008 | Jeong et al. |
| 2008/0195799 | A1 | 8/2008 | Park et al. |
| 2008/0211303 | A1 | 9/2008 | Ikegawa |
| 2008/0288814 | A1* | 11/2008 | Kitahara ........................... 714/5 |
| 2009/0019340 | A1* | 1/2009 | Radke et al. ................... 714/763 |
| 2009/0063934 | A1* | 3/2009 | Jo ................................. 714/764 |
| 2009/0100115 | A1 | 4/2009 | Park et al. |
| 2009/0113114 | A1 | 4/2009 | Berenbaum et al. |
| 2009/0125785 | A1* | 5/2009 | Gorobets et al. .............. 714/763 |
| 2009/0164698 | A1 | 6/2009 | Ji et al. |
| 2009/0198902 | A1 | 8/2009 | Khmelnitsky et al. |
| 2009/0198947 | A1 | 8/2009 | Khmelnitsky et al. |
| 2009/0198952 | A1 | 8/2009 | Khmelnitsky et al. |
| 2009/0265513 | A1* | 10/2009 | Ryu ............................. 711/149 |
| 2010/0250836 | A1* | 9/2010 | Sokolov et al. ............... 711/103 |
| 2010/0287329 | A1 | 11/2010 | Toelkes et al. |
| 2010/0287353 | A1 | 11/2010 | Khmelnitsky et al. |
| 2011/0153911 | A1 | 6/2011 | Sprouse et al. |
| 2011/0213945 | A1 | 9/2011 | Post et al. |

OTHER PUBLICATIONS

Wakrat et al., "Memory Array Power Cycling", U.S. Appl. No. 12/561,158, filed Sep. 16, 2009.

Wakrat et al., "File System Derived Metadata for Management of Non-Volatile Memory", U.S. Appl. No. 12/561,173, filed Sep. 16, 2009.

Toelkes et al., "Partial Page Operations for Non-Volatile Memory Systems", U.S. Appl. No. 12/536,410, filed Aug. 5, 2009.

Khmelnitsky et al., "Multipage Preparation Commands for Non-Volatile Memory Systems", U.S. Appl. No. 12/545,011, filed Aug. 20, 2009.

Wakrat et al., "Controller for Optimizing Throughput of Read Operations", U.S. Appl. No. 12/509,240, filed Jul. 24, 2009.

International Search Report and Written Opinion for Application No. PCT/US2010/032627, dated Jul. 21, 2010, 13 pages.

Toshiba, "TC58NVG0S3ETA00 Toshiba Mos Digital Integrated Circuit Silicon Gate CMOS," Nov. 20, 2008, revision 1.00, Semico Toshiba, pp. 1-65. http://www.semicon.toshiba.co.jp/docs/datasheet/en/Memory/TC58NVG0S3ETA00_en_datasheet_110301.pdf.

International Search Report/Written Opinion in PCT/US2009/065804 mailed May 10, 2010, 17 pages.

Invitation to Pay Additional Fees and, Where Applicable, Protest Fee in PCT/US2009/065804 mailed Mar. 4, 2010, 4 pages.

International Search Report/Written Opinion in PCT/US2010/032628 dated Aug. 11, 2010, 12 pages.

"Increasing Boot Operations with Managed NAND," QuickLogic® White Paper, Quicklogic Corporation [online], Retrieved from the Internet: <http://www.quicklogic.com/images/QL:_Increasing_Boot_Opt_w_Managed_NAND_WP_RevE.pdf>, 2007-2009, 8 pages.

"Dual supply level translator for dual memory cards (mini SD/micro SD + managed NAND)," STMicroelectronics, Paper No. ST6G3240 [online], Retrieved from the Internet: <http://www.st.com/stonline/products/literature/ds/14581.pdf>, Apr. 2008, 29 pages.

Lim et al., "An Efficient NAND Flash File System for Flash Memory Storage," IEEE Transactions on Computers, 2006, 55(7):906-912.

International Preliminary Report on Patentability in PCT/US2009/065804 mailed Jul. 7, 2011, 12 pages.

Authorized officer Yolaine Cussac, International Preliminary Report on Patentability in PCT/US2010/32627 mailed Nov. 9, 2011, 8 pages.

International Preliminary Report on Patentability in PCT/US2010/032628 dated Nov. 9, 2011, 8 pages.

* cited by examiner

| Stride Number | CAU 0 | CAU 1 | CAU 2 |
|---|---|---|---|
| 1 | CAU 0, Block 1 | CAU 1, Block 1 | CAU 2, Block 1 |
| 2 | CAU 0, Block 2 | CAU 1, Block 2 | CAU 2, Block 2 |
| 3 | CAU 0, Block 3 | CAU 1, Block 3 | CAU 2, Block 3 |
| 4 | CAU 0, Block 4 | CAU 1, Block 2000 | CAU 2, Block 4 |
| 5 | CAU 0, Block 5 | CAU 1, Block 5 | CAU 2, Block 5 |
| 6 | CAU 0, Block 6 | CAU 1, Block 6 | CAU 2, Block 6 |
| 7 | CAU 0, Block 7 | CAU 1, Block 7 | CAU 2, Block 7 |
| ... | ... | ... | ... |
| 1999 | CAU 0, Block 1999 | CAU 1, Block 1999 | CAU 2, Block 1999 |

LOW LATENCY READ OPERATION FOR MANAGED NON-VOLATILE MEMORY

RELATED APPLICATION

This application claims the benefit of priority from U.S. Provisional Patent Application No. 61/176,055, which is incorporated by reference herein in its entirety.

TECHNICAL FIELD

This subject matter is related generally to access and management of managed non-volatile memory (NVM).

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate.

NAND is a type of flash memory that can be accessed like a block device, such as a hard disk or memory card. Each block consists of a number of pages (e.g., 64-128 pages). A typical page size is 4 KB-8 KB bytes. A NAND device can have multiple dies each having 4096-8192 blocks. Associated with each page are a number of bytes (e.g., 12-16 bytes) that are used for storage of error detection and correction checksums. Reading and programming is performed on a page basis, erasure is performed on a block basis, and data in a block can only be written sequentially. NAND relies on Error Correction Code (ECC) to compensate for bits that may flip during normal device operation. When performing erase or program operations, the NAND device can detect blocks that fail to program or erase and mark the blocks as bad in a bad block map. The data can be written to a different, good block, and the bad block map updated.

Managed NAND devices combine raw NAND with a memory controller to handle error correction and detection, as well as memory management functions of NAND memory. Managed NAND is commercially available in Ball Grid Array (BGA) packages, or other Integrated Circuit (IC) package which supports standardized processor interfaces, such as Multimedia Memory Card (MMC) and Secure Digital (SD) card. A managed NAND device can include a number of NAND devices or dies which can be accessed using one or more chip select signals. A chip select is a control line used in digital electronics to select one chip out of several chips connected to the same bus. The chip select is typically a command pin on most IC packages which connects the input pins on the device to the internal circuitry of that device. When the chip select pin is held in the inactive state, the chip or device ignores changes in the state of its input pins. When the chip select pin is held in the active state, the chip or device responds as if it is the only chip on the bus.

The Open NAND Flash Interface Working Group (ONFI) has developed a standardized low-level interface for NAND flash chips to allow interoperability between conforming NAND devices from different vendors. ONFI specification version 1.0 specifies: a standard physical interface (pin-out) for NAND flash in TSOP-48, WSOP-48, LGA-52, and BGA-63 packages; a standard command set for reading, writing, and erasing NAND flash chips; and a mechanism for self-identification. ONFI specification version 2.0 supports dual channel interfaces, with odd chip selects (also referred to as chip enable or "CE") connected to channel 1 and even CEs connected to channel 2. The physical interface shall have no more than 8 CEs for the entire package.

While the ONFI specifications allow interoperability, the current ONFI specifications do not take full advantage of Managed NAND solutions.

SUMMARY

In a memory system, a host controller is coupled to a non-volatile memory (NVM) package (e.g., NAND device). The host controller sends a read command to the NVM package requesting a low latency read operation. Responsive to the read command, a controller in the NVM package retrieves the data and sends the data to an ECC engine for correcting. Following the read command, the host controller sends a read status request command to the controller in the NVM package. Responsive to the read status request, the controller sends a status report to the host controller indicating that some or all of the data is available for transfer to the host controller. Responsive to the report, the host controller transfers the data.

In some implementations, an underrun status is determined by the controller in the NVM package and reported to the host controller in response to a read operation status request command sent by the host controller at the end of the read operation. The read operation status reported by the NVM package indicates whether there was an underrun, where uncorrected data was transferred to the host controller, as well as whether the data was correctable or uncorrectable. Based on the read operation status, the host controller can take action, such as performing another read operation without regard to low latency.

An advantage of the disclosed low latency read operations is that corrected portions of requested data can be transferred to the host controller, as compared to conventional non-volatile memory systems where all of the requested data is loaded in a buffer and corrected before any of the data is transferred to the host controller.

BRIEF DESCRIPTION OF THE DRAWINGS

FIG. 3 illustrates the address mapping of FIG. 2 including bad block replacement.

DETAILED DESCRIPTION

Memory System Overview

Figure 1:
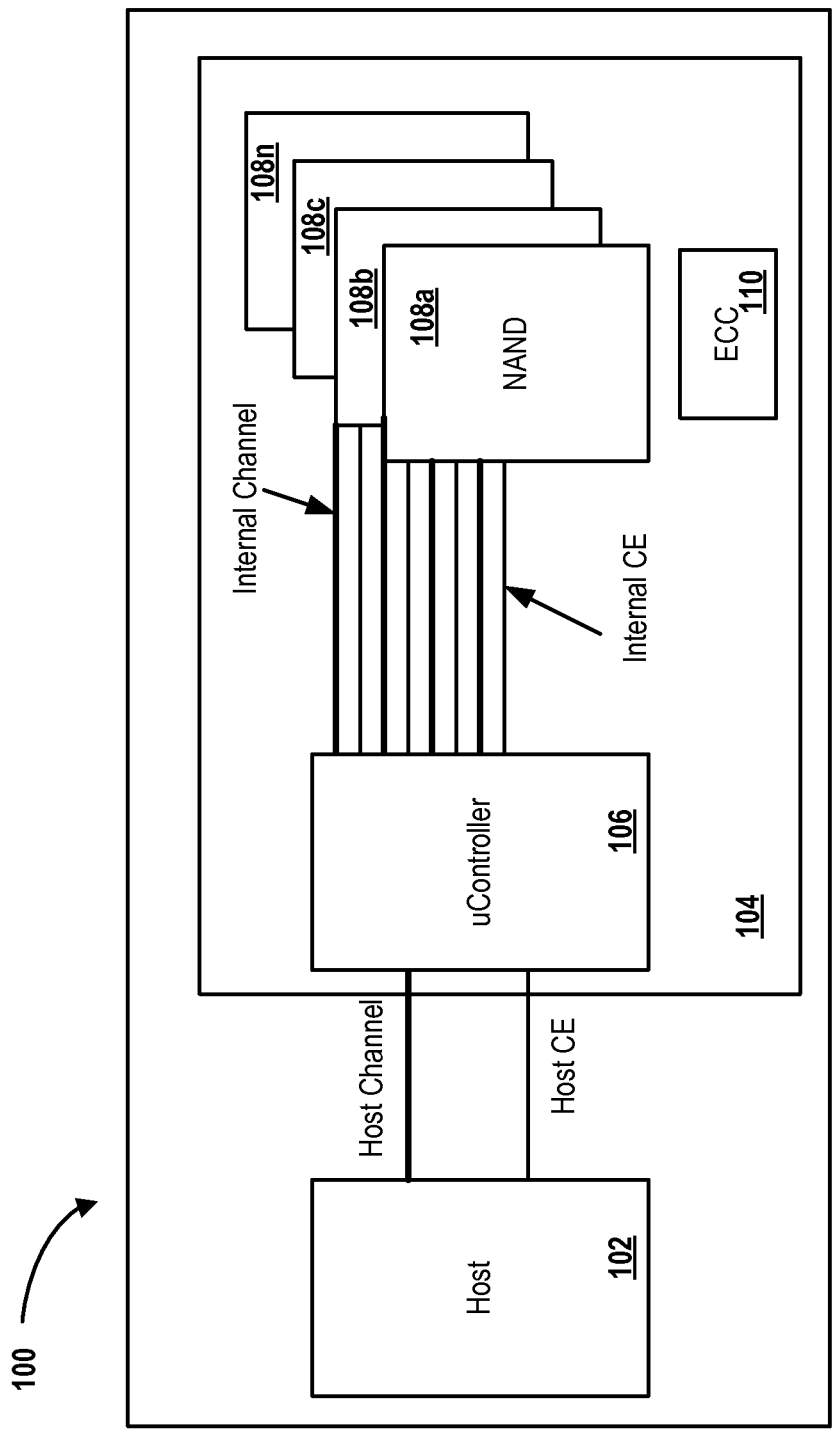
FIG. 1 is a block diagram of an exemplary memory system including a host processor coupled to a managed NVM package.

FIG. 1 is a block diagram of an exemplary memory system 100 including a host controller 102 coupled to a managed NVM package 104 (e.g., a NAND device). The NVM package 104 can be a BGA package or other IC package, including multiple NVM devices 108 (e.g., multiple raw NAND devices). The memory system 100 can be used in a variety of devices, including but not limited to: handheld computers, mobile phones, digital cameras, portable music players, toys, thumb drives, email devices, and any other devices in which non-volatile memory is desired or required. As used herein, raw NVM is a memory device or package which is managed by an external host processor, and managed NVM is a memory device or package that includes at least one internal memory management function, such as error correction, wear leveling, bad block management, etc.

In some implementations, the NVM package 104 can include a controller 106 for accessing and managing the NVM devices 108 over internal channels using internal chip select signals. An internal channel is a data path between the controller 106 and a NVM device 108. The controller 106 can perform memory management functions (e.g., wear leveling, bad block management) and can include an error correction (ECC) engine 110 for detecting and correcting data errors (e.g., flipped bits). In some implementations, the ECC engine 110 can be implemented as a hardware component in the controller 106 or as a software component executed by the controller 106. In some implementations, the ECC engine 110 can be located in the NVM devices 108.

In some implementations, the host controller 102 and NVM package 104 can communicate information (e.g., control commands, addresses, data) over a communication channel visible to the host ("host channel"). The host channel can support standard interfaces, such as raw NAND interfaces or dual channel interfaces, such as is described in ONFI specification version 2.0. The host controller 102 can also provide a host chip enable (CE) signal. The host CE is visible to the host controller 102 to select the host channel.

In the exemplary memory system 100, the NVM package 104 supports CE hiding. CE hiding allows the single host CE to be used for each internal channel in the NVM package 104, thus reducing the number of signals required to support the interface of the NVM package 104. Memory accesses can be mapped to internal channels and the NVM devices 108 using an address space and address mapping, as described in reference to FIGS. 2 and 3. Individual NVM devices 108 can be enabled using internal CE signals generated by the controller 106.

Exemplary Address Mapping

Figure 2:
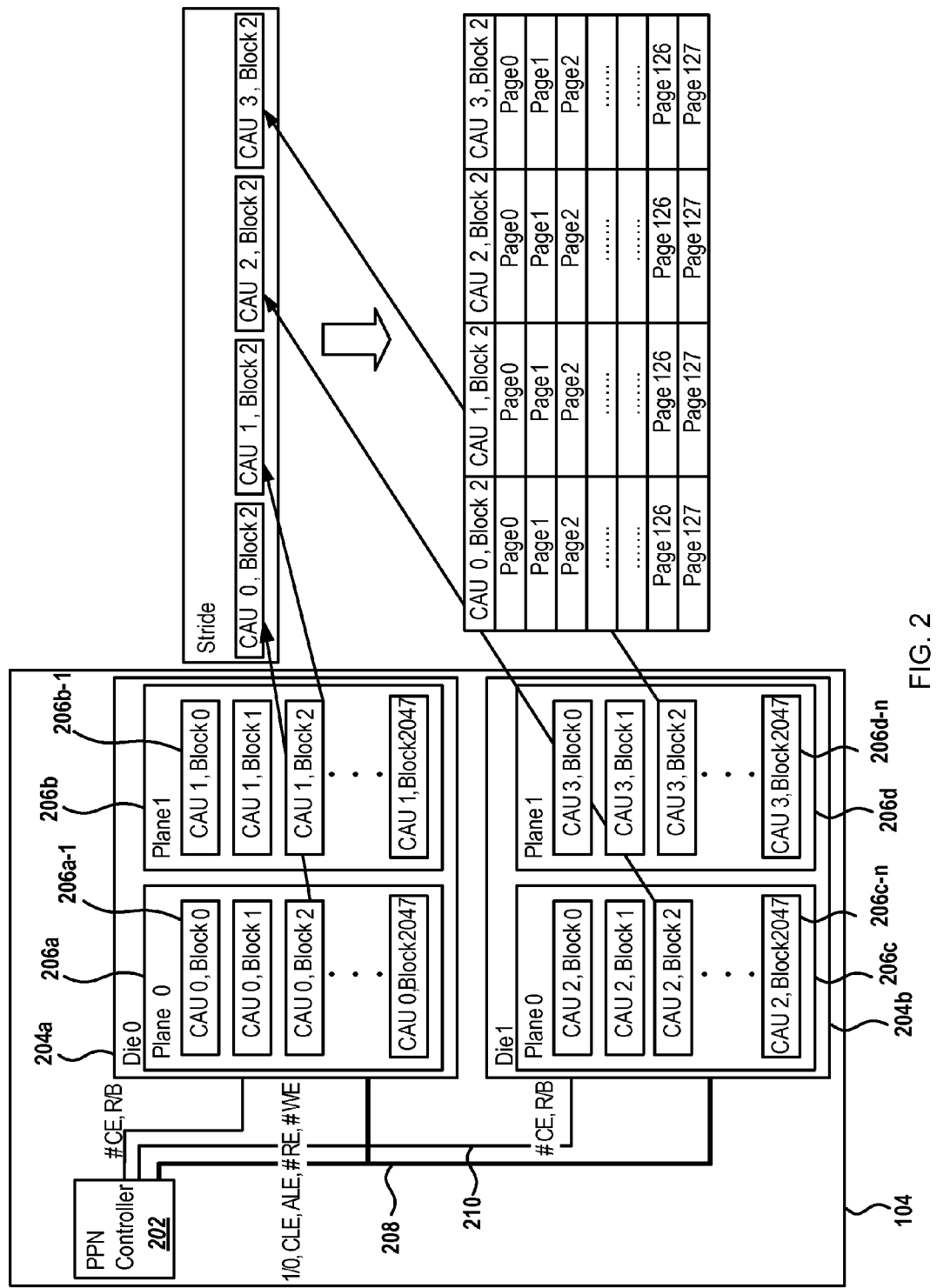
FIG. 2 illustrates an exemplary address mapping for the managed NVM package of FIG. 1.

FIG. 2 illustrates an exemplary address mapping for the managed NVM package 104 of FIG. 1. In particular, the mapping can be used with managed NAND devices that include multiple dies, where each die can potentially include multiple planes. In some implementations, the address mapping operates on Concurrently Addressable Units (CAUs). A CAU is a portion of physical storage accessible from a single host channel that may be read, programmed or erased simultaneously to, or in parallel with other CAUs in the NVM package. A CAU can be, for example, a single plane or a single die. A CAU size is the number of erasable blocks in a CAU.

The mapping will be described using the exemplary memory architecture of FIG. 2. For this exemplary architecture, a block size is defined as a number of pages in an erasable block. In some implementations, 16 bytes of metadata are available for each 4 kilobytes of data. Other memory architectures are also possible. For example, the metadata can be allocated more or fewer bytes.

The address mapping shown in FIG. 2 allows the use of raw NAND protocol to read/program/erase NAND blocks and additional commands that enable optimized performance. The NVM package 104 includes an ECC engine (e.g., ECC engine 110) for managing data reliability of the NAND. Thus, the host controller 102 does not need to include an ECC engine 110 or otherwise process data for reliability purposes.

The NVM package 104 defines a CAU as an area that can be accessed (e.g., moving data from the NAND memory cells to an internal register) simultaneous to, or in parallel with, other CAUs. In this exemplary architecture, it is assumed that all CAUs include the same number of blocks. In other implementations, CAUs can have a different numbers of blocks. Table I below describes a exemplary row address format for accessing a page in a CAU.

TABLE I

Exemplary Row Address Format

| R[X + Y:X + Z − 1] | R[X:X + Y − 1] | R[0:X − 1] |
|---|---|---|
| CAU | Block | Page |

Referring to Table I, an exemplary n-bit (e.g., 24 bits) row address can be presented to a controller in the NAND device in the following format: [CAU: Block: Page]. CAU is a number (e.g., an integer) that represents a die or plane. Block is a block offset in the CAU identified by the CAU number, and Page is a page offset in the block identified by Block. For example, in a device with 128 pages per block, 8192 blocks per CAU and 6 CAUs: X will be 7 (27=128), Y will be 13 (213=8192) and Z will be 3 (22<6<23).

The exemplary NVM package 104 shown in FIG. 2 includes two NAND dies 204a, 204b, and each die has two planes. For example, die 204a includes planes 206a, 206b. And, die 204b includes planes 206c, 206d. In this example, each plane is CAU and each CAU has 2048 multi-level cell (MLC) blocks with 128 pages per block. Program and erase operations can be performed on a stride of blocks (a block from each CAU). A stride is defined as an array of blocks each coming from a different CAU. In the example shown, a "stride 0" defines a block 0 from each of CAUs 0-3, a "stride 1" defines a block 1 from each of CAUs 0-3, a "stride 2" defines a block 2 from each of CAUs 0-3 and so forth.

The NVM package includes an NVM controller 202, which communicates with the CAUs through control bus 208 and address/data bus 210. During operation, the NVM controller 202 receives commands from the host controller (not shown) and in response to the command asserts control signals on the control bus 208 and addresses or data on the address/data bus 210 to perform an operation (e.g., read, program, or erase operation) on one or more CAUs. In some implementations, the command includes a row address having the form [CAU: Block: Page], as described in reference to FIG. 2.

FIG. 3 illustrates the address mapping of FIG. 2 including bad block replacement. In this example, the host controller 102 has issued a stride address for an NVM package 104 including three CAUs, where one of the CAUs holds a bad block in the stride block offset. A "stride 4" address would normally access CAU0: Block4, CAU1: Block4 and CAU2: Block4. In this example, however, the bad block CAU1: Block4 is replaced by CAU1: Block2000.

Exemplary Low Latency Read Operation

Figure 4:
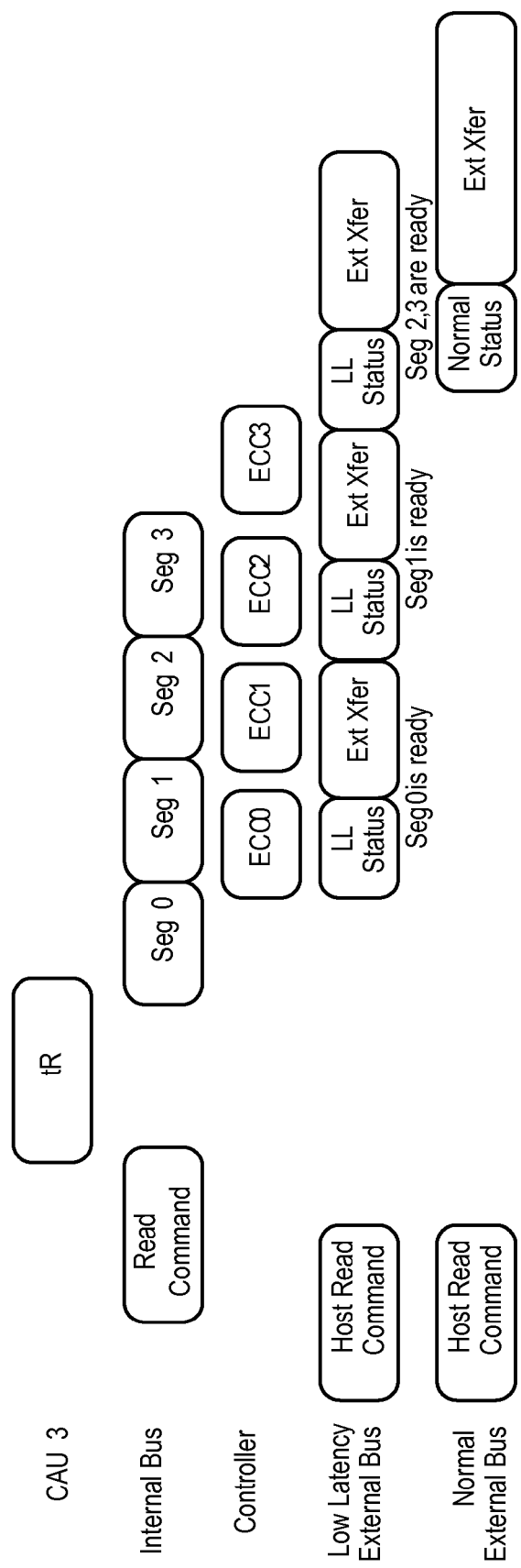
FIG. 4 illustrates an exemplary method of a low latency read of managed non-volatile memory

FIG. 4 illustrates an exemplary method of a low latency read operation for managed non-volatile memory. A low latency read status function allows the host controller to start transferring bytes of data following a read operation as soon as portions of a page of data are ready. This read status operation indicates when the first portion of the data is ready. Assuming that the host controller and NVM controller busses use similar timing and that the ECC procedure does not significantly impact latency throughout the read operation, starting the transfer of an ECC segment as soon as the segment is ready can provide a significant latency improvement.

To verify a page was correctly delivered, the host controller can read a status provided by the NVM controller before and after transferring the data. To prevent confusion regarding the status owner, the protocol can specify as an illegal condition having two pending commands executed using the same row address. The following Table II describes exemplary information returned by the operation read status function described above. An 8-bit return value is assumed for this example.

TABLE II

Exemplary Return Information For Operation Read Status Function

| Bit | Read |
| --- | --- |
| 0 | 1 - ECC delay (host read areas of the page before it was ready). User should use the operation read status and potentially reread the page. |
| 1 | 1 - Data was properly read from the device. User should use operation read status for additional status information |
| 2 | Reserved |
| 3 | Reserved |
| 4 | Reserved |
| 5 | Reserved |
| 6 | 1 - Data is ready to begin transfer |
| 7 | Reserved |

Referring to Table II above, if the NVM controller returns a "0", then there was an ECC delay. The host controller read a portion of a page before the portion was processed by the ECC engine. If this condition occurs, the host controller can use the operation read status and potentially reread the page. If the NVM controller returns a "1", the data was improperly read from the NVM package. The host controller can issue another read status command for additional status information. Other information can be returned in a status from the NVM package as desired.

Referring again to FIG. 4, what is shown are four stacked rows of low latency read events performed during a low latency read operation by an internal bus, an NVM controller, a low latency external bus and a normal external bus. Time increases along the x-axis from left to right. The internal bus and NVM controller are located in the NVM package (e.g., a NAND device). The low latency and normal external buses couple the host controller (e.g., host controller 102) to the NVM package.

Referring now to FIG. 4, a low latency read command is sent from the host controller to the NVM controller over the low latency external bus. The read command is processed by the NVM controller. In this example, the NVM device includes three CAUs, which can be accessed using the map addressing described in reference to FIG. 2. The NVM controller begins processing ECC segments of data read from the CAUs. The segments of data (e.g., one or more pages) are transferred from memory cells to a buffer. An ECC segment can be defined as a correctable unit size that includes data plus metadata. Once the segment is in the buffer, the segment can be processed by the ECC engine and an indication of whether the segment is corrected or uncorrectable by the ECC engine can be recorded.

After the host controller issues a read command, the host controller issues a low latency status request command ("LL status") to the NVM controller to determine if an ECC segment is available. The NVM controller responds with a status indicating that an ECC segment is available for transfer to the host controller or an error code indicating that there was a problem with the data. If the status indicates that an ECC segment is available, the host controller issues an external transfer command ("Ext Xfer") to transfer the ECC segment to the host controller over the external bus. This process repeats itself until there are no more ECC segments indicating that the read operation is complete. If the status indicates an error, then a normal process for handling bad data can be performed (e.g., bad block replacement).

It is possible that during a low latency read operation that a segment of data is transferred on the external bus without being first processed by the ECC engine because the ECC engine could not complete the ECC process in time for the external transfer to the host controller. This is referred to as an "underrun." To address this issue, the host controller issues a final status request command to determine if data was transferred that did not receive ECC processing or if any bad data was uncorrectable. If the NVM controller provides a status indicating an underrun or that the segment includes bad data that could not be corrected, then the host controller and NVM controller perform a normal read operation using the normal external bus protocol. In some implementations, a normal read operation results in the data to be read to be transferred in its entirety to a buffer. The entire buffer of data is then processed by the ECC engine before being transferred on the normal external bus to the host controller. The normal read operation is illustrated by the bottom row in FIG. 4.

Exemplary Underrun Condition Determination

Figure 5:
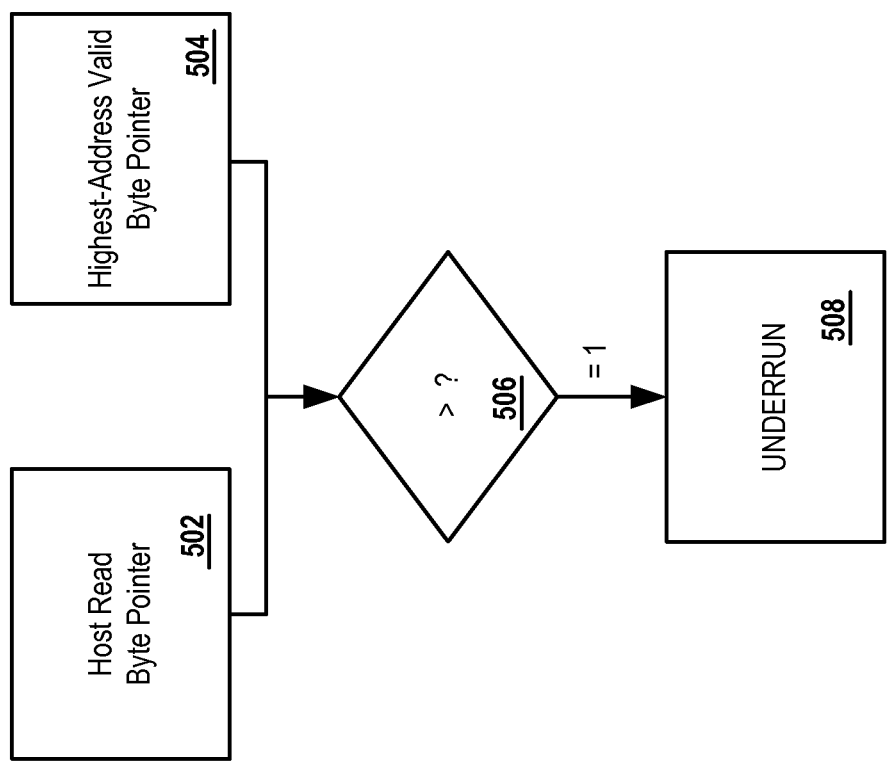
FIG. 5 illustrates an exemplary process for determining an underrun status in a low latency read operation.

FIG. 5 illustrates an exemplary process for determining an underrun status in a low latency read operation. In some implementations, two pointers are maintained: a host read byte pointer 502 and a highest address valid byte pointer 504. The pointer 502 can be implemented using an n-bit flip-flop. The pointer 502 increments in host bus width chunks (e.g., increments in bytes). The pointer 502 can be initialized to the Page offset address specified in the row address [CAU: Bock: Page] included in the read command sent by the host controller. The pointer 504 can also be implemented using an n-bit flip-flop. The pointer 504 increments in ECC segments. The pointer 504 increments when an ECC segment is known to be corrected or uncorrectable.

The pointers 502, 504 can be compared by a comparator 506 to determine if the value of pointer 502 is greater than the value of pointer 504, indicating an underrun. If an underrun is detected, then an underrun flip-flop can be set to "1". In this example, it is assumed that the underrun flip-flop was initialized to "0". There are four outcomes for the underrun logic, which are listed in Table III below.

TABLE III

Exemplary Outcomes and Actions For Underrun Process

| Outcomes | Actions |
| --- | --- |
| No Underrun, data OK | Proceed as normal |
| No Underrun, data uncorrectable | Proceed as normal |

TABLE III-continued

Exemplary Outcomes and Actions For Underrun Process

| Outcomes | Actions |
|---|---|
| Underrun, data OK | Retry, ignore early-transfer start bit |
| Underrun, data uncorrectable | Proceed as normal, or retry |

If there is no underrun and the data is good, then the read operation will proceed as normal. If there is no underrun and there is bad data that is uncorrectable, then the read operation can proceed as normal (e.g., perform bad block replacement). If there is an underrun and the data is good, the read operation can be retried without performing an early transfer of ECC segments to the host controller. If there is an underrun and the data is uncorrectable, then the read operation can proceed as normal or retried.

Alternative Low Latency Read Operation

Figure 6:
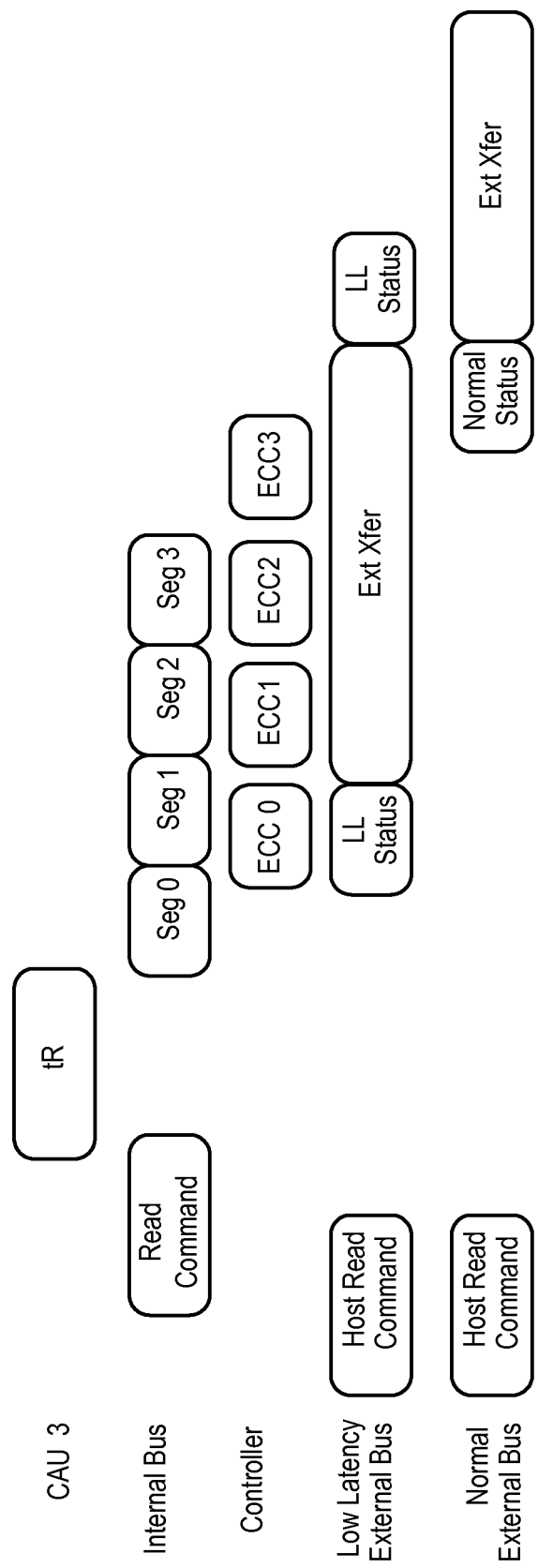
FIG. 6 illustrates another exemplary method of a low latency read of managed non-volatile memory

FIG. 6 illustrates another exemplary method of low latency read of managed non-volatile memory. FIG. 6 is similar in form to FIG. 5 and should be interpreted the same as FIG. 5. In this exemplary method, a read command is sent to the NVM controller over an external low latency bus. The read command is transferred to the NVM controller over an internal bus. The NVM controller transfers the requested data into a buffer and performs ECC operations on the data in the buffer. In this example, a read status command is sent to the NVM controller. The NVM controller returns a status indicating a number of ECC segments that are available for transfer to the host controller. The host controller initiates the transfer of the available ECC segments. After completion of the transfer, a final read status is requested by the host processor. Thus, rather than waiting for the entire data to be processed before transferring, the method illustrated in FIG. 6 allows for transfer ECC segments as soon as the segments are ready. Since the data is not allowed to be transferred until the data has been processed by the ECC engine, an underrun cannot occur using this method.

Exemplary Processes Performed By Host Processor

Figure 7:
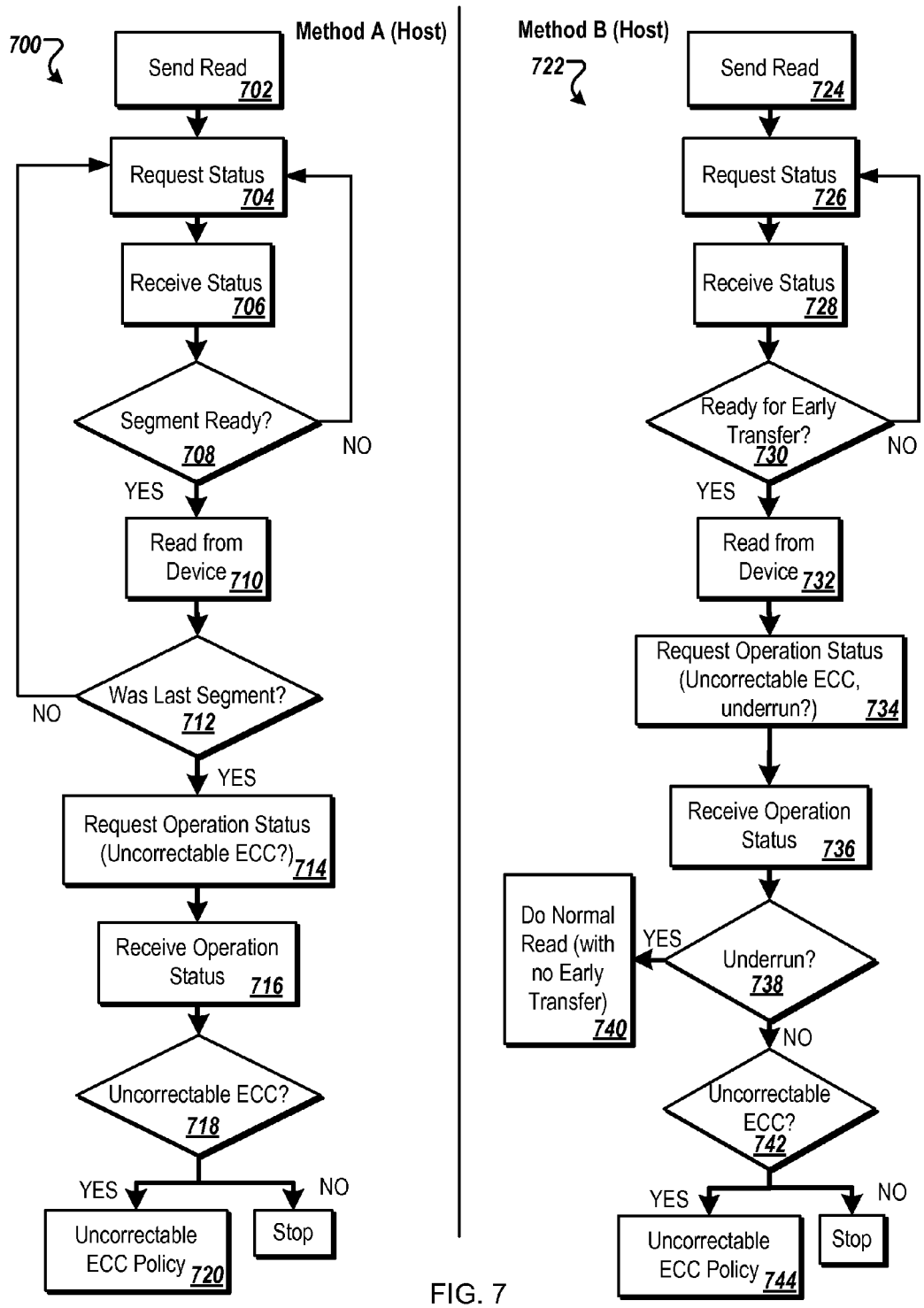
FIG. 7 is a flow diagram of low latency read operations performed by a host controller.

FIG. 7 is a flow diagram of low latency read operations 700, 722 performed by a host controller (e.g., host controller 102). The process 700 is also referred to as Method A (Host), and the process 722 is also referred to as Method B (Host).

In some implementations, the process 700 begins when the host controller sends a read command to an NVM controller (702). Following the read command, the host controller sends a read status request command to the NVM controller (704). The host controller receives a status report from the NVM controller (706). The status report indicates whether an ECC segment is ready for transfer (708). If the ECC segment is not ready for transfer, the process 700 returns to step 704. Otherwise, data is read from the NVM package (710) and sent to the host controller.

A determination is made as to whether the last segment was read (712). If the last segment was not read the process returns to step 704. Otherwise, the host controller requests a final read status request to determine if there is a uncorrectable ECC segment (714). The host controller receives the operation status (716). If the status report indicates an uncorrectable ECC segment (718), an uncorrectable ECC policy is implemented (720). Otherwise, the process 700 terminates.

Note that process 700 reports ready ECC segments of data for transfer, and the host controller transfers only the data that has be corrected or found to be uncorrectable.

In some implementations, the process 722 begins when the host controller sends a read command to an NVM controller (724). Following the read command, the host controller sends a read status request command to the NVM controller (726). The host controller receives a status report from the NVM controller (728). The status report indicates whether an ECC segment is ready for early transfer (730). If the ECC segment is not ready for early transfer, then the process 722 returns to step 726. Otherwise, the ECC segment is read from the device (732) and transferred to the host controller. The host controller requests read status to determine if there is an uncorrectable ECC segment or an underrun (734).

The host controller receives a status from the NVM controller (736). A determination is made as to whether an underrun occurred or an uncorrectable ECC (738). If there was an underrun, then the host controller performs a normal read operation (an operation at normal latency) with no early transfer of data to the host controller (740). If there is an uncorrectable ECC (742), then an uncorrectable ECC policy is performed (744). Otherwise the process 722 terminates.

Note that in process 722, the NVM controller reports to the host controller that it can begin transferring data while it is still indeterminate whether the data has been corrected or is uncorrectable, but late enough that the NVM controller thinks it can stay ahead of the host controller. Process 722 also includes a method for determining if the host controller ran ahead of the NVM controller ECC processing of the data, which is referred to as an "underrun."

Exemplary Processes Performed by NVM Controller

Figure 8:
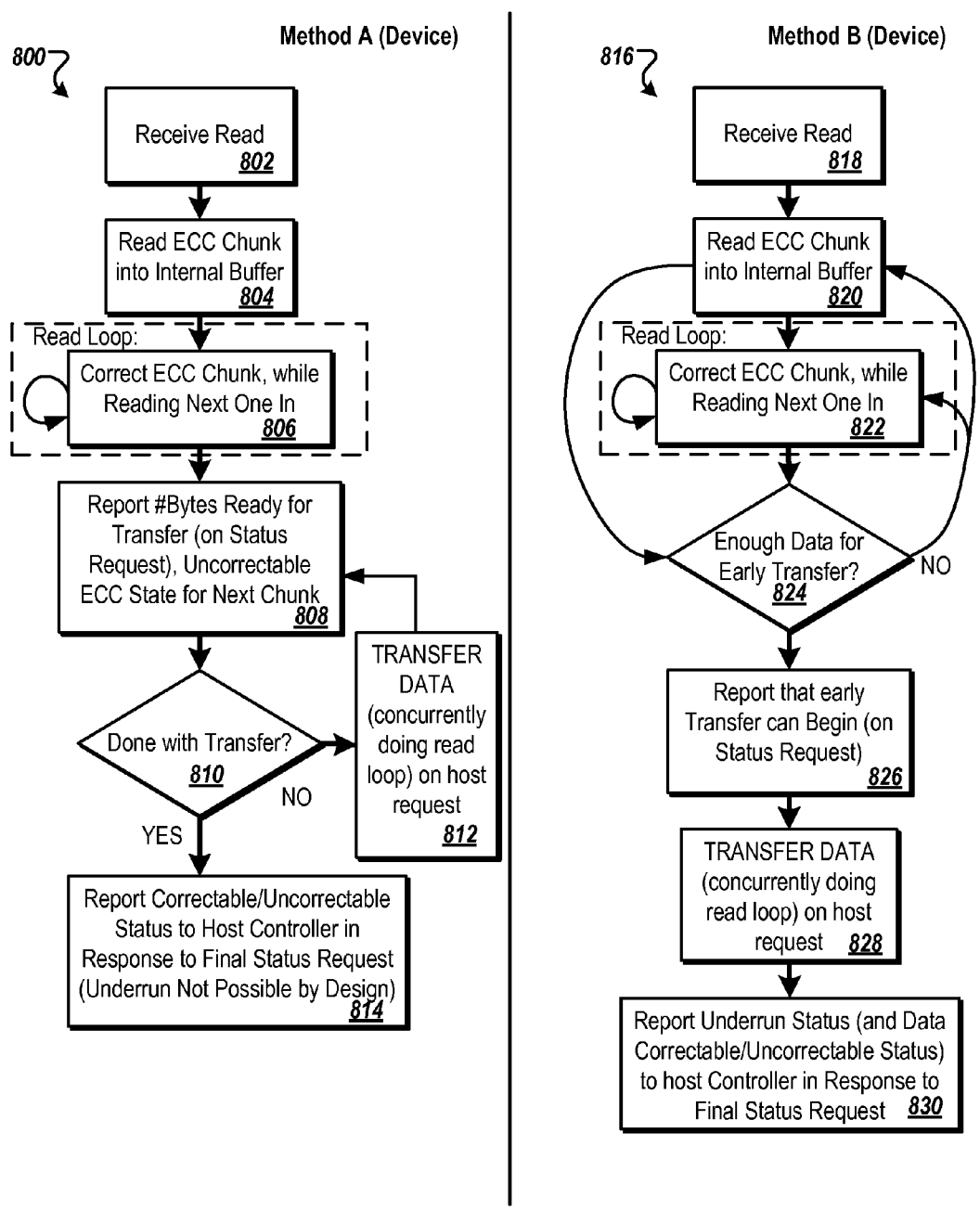
FIG. 8 is a flow diagram of low latency read operations performed by an NVM controller.

FIG. 8 is a flow diagram of low latency read operations 800, 816 performed by an NVM controller. The process 800 is also referred to as Method A (Device) and the process 816 is also referred to as Method B (Device).

In some implementations, the process 800 begins when the NVM controller receives a read command (802). Responsive to the read command, the NVM controller reads an ECC segment (also referred to as a "chunk") into an internal buffer (804). The contents of the buffer are processed by an ECC engine to correct the ECC segment (806). In some implementations, a next ECC segment can be read while the current ECC segment is being processed by the ECC engine.

Next, the NVM controller receives a read status request and responds to the request by reporting data available for transfer (808). The report can include a number of bytes ready for transfer or an uncorrectable ECC state for the next chunk. A determination is made as to whether the transfer is complete (810). If the transfer is complete, and in response to a final status request by the host controller, the NVM controller provides a report of correctable/uncorrectable status to the host controller (814). Otherwise, data is transferred to the host controller (812) and the process 800 returns to step 808. In some implementations, the data is transferred concurrently with the read loop on the host request described in step 806. There is no underrun for process 800 by design.

In some implementations, the process 816 begins when the NVM controller receives a read command (818). Responsive to the read command, the NVM controller reads an ECC segment/chunk into an internal buffer (820). The contents of the buffer are processed by an ECC engine to correct the ECC segment (822). In some implementations, a next ECC segment can be read while the current ECC segment is being processed by the ECC engine.

Next, a determination is made as to whether there is enough data for early transfer (824). Responsive to a read status request command from the host controller, a report is provided by the NVM controller that early transfer of data can begin (826). Data is transferred to the host controller (828). In some implementations, the data can be transferred concurrently with the read loop on the host request described in step 822. Responsive to a final read status request command from the host controller, the NVM controller reports underrun status and correctable/uncorrectable status to the host controller (830).

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A non-volatile memory (NVM) device, comprising:
an interface configured to receive a read command and a read status request from a host controller;
a number of concurrently addressable memory units each containing a number of blocks, wherein each concurrently addressable unit is configured to be simultaneously readable with respect to the other concurrently addressable memory units, and wherein the read command specifies one or more blocks of one or more of the concurrently addressable memory units from which to read data;
a controller coupled to the interface and the number of concurrently addressable memory units, the controller configured to:
read data from the one or more blocks of the one or more concurrently addressable memory units specified by the read command;
error correct a portion of the data;
make the error corrected portion of the data available for transferring to the host controller prior to making another portion of the data available for transfer; and
respond to the read status request with information indicating that the error corrected portion of the data is available for transfer.

2. The device of claim 1, where the information includes one or more bits indicating an error correcting code delay.

3. The device of claim 1, where the information includes one or more bits indicating that data was properly read from a memory array of the NVM device.

4. The device of claim 1, where the information includes one or more bits indicating that data is ready to be transferred from the NVM device to the host controller.

5. A host controller configured for coupling with a non-volatile memory (NVM) device, comprising:
an interface configured to couple to the NVM device; and
a controller coupled to the interface and configured to:
send a read command and a read status request to the NVM device;
receive, in response to the read status request, information indicating that an error corrected portion of the data is available for transfer to the controller prior to another portion of the data being available for transfer; and
transfer the error corrected portion of data from the NVM to the controller, prior to transferring another portion of the data.

6. A method performed by a non-volatile memory (NVM) device, the method comprising:
receiving a read command and a read status request from a host controller coupled to the NVM device;
reading data from a number of concurrently addressable memory units in the NVM device that are identified by the read command, wherein each concurrently addressable unit is configured to be simultaneously readable with respect to the other concurrently addressable memory units;
error correcting a portion of the data to be read; and
making the error corrected portion of data available for transferring to the host controller prior to making another portion of the data available for transfer; and
responding to the read status request with information indicating that the error corrected portion of data is available for transfer.

7. The method of claim 6, where the information includes one or more bits indicating an error correcting code delay.

8. The method of claim 6, where the information includes one or more bits indicating that data was properly read from a memory array of the NVM device.

9. The method of claim 6, where the information includes one or more bits indicating that data is ready to be transferred from the NVM device to the host controller.

10. A method performed by a host controller configured for coupling with a non-volatile memory (NVM) device, the method comprising:
sending a read command and a read status request to the NVM device;
receiving, in response to the read status request, information indicating that an error corrected portion of data to be read is available for transfer to the host controller prior to another portion of the data being available for transfer; and
transferring the error corrected portion of the data from the NVM device to the host controller prior to transferring another portion of the data.

11. The method of claim 10, where the information received in response to the read status request also includes one or more of an underrun status or an indication of whether the data was correctable and the host controller sends another read command to the NVM device in response to the information.

12. The method of claim 10, where the information includes one or more bits indicating an error correcting code delay.

13. The method of claim 10, where the information received in response to the read status request includes one or more bits indicating that data was properly read from the NVM device.

14. The method of claim 10, where the information received in response to the read status request includes one or more bits indicating that data is ready to be transferred from the NVM device to the host controller.

15. The method of claim 10, where the information received in response to the read status request is received before or after a portion of the data is transferred to the host controller.

16. The method of claim 10, where the information received in response to the read status request indicates a number of error correcting code segments available for transfer to the host controller.

17. A memory system, comprising:
a host controller;
a non-volatile memory (NVM) device;
an interface coupling the host controller and the NVM device, the host controller configured to send a read command and a read status request to the NVM device over the interface;
a number of concurrently addressable memory units included in the NVM device, the memory units containing a number of blocks, wherein each concurrently addressable unit is configured to be simultaneously readable with respect to the other concurrently addressable memory units and wherein the read command specifies one or more blocks of one or more of the concurrently addressable memory units from which to read data;
a controller of the NVM device coupled to the number of concurrently addressable memory units, the controller configured to:
read data from the number of blocks of the number of concurrently addressable memory units specified by the read command;
error correct a portion of the data; and
make the error corrected portion of the data available for transferring from the NVM device to the host controller over the interface prior to another portion to making another portion of the data available for transfer; and
respond to the read status request with information indicating that the error corrected portion of the data is available for transfer.

18. The system of claim 17, where the information includes one or more bits indicating that data is ready to be transferred from the NVM device to the host controller.

19. The system of claim 17, where the information can be sent to the NVM device before or after data is transferred to the host controller.

20. The system of claim 17, where the information indicates a number of error correcting code segments available for transfer to the host controller.

21. The method of claim 1, where the information includes an underrun status.

22. The method of claim 1, where the information includes an indication of whether the data was correctable.

* * * * *